United States Patent [19]
Ebbinga

[11] 4,194,222
[45] Mar. 18, 1980

[54] MULTITRACK RECORDER INCLUDING SUPERIMPOSED REAL TIME CODE

[75] Inventor: Richard D. Ebbinga, Camarillo, Calif.

[73] Assignee: Minnesota Mining and Manufacturing Company, Saint Paul, Minn.

[21] Appl. No.: 936,108

[22] Filed: Aug. 23, 1978

[51] Int. Cl.² ............................................. G11B 5/02
[52] U.S. Cl. ....................................... 360/18; 360/20; 360/30; 360/55; 360/69
[58] Field of Search ...................... 360/18, 20, 22, 30, 360/65, 66, 68, 43

[56] References Cited

U.S. PATENT DOCUMENTS

| | | | |
|---|---|---|---|
| 3,188,615 | 6/1965 | Wilcox, Jr. | 360/32 |
| 3,732,364 | 5/1973 | Teradz | 360/43 |
| 3,945,035 | 3/1976 | Goldman | 360/7 |
| 4,012,784 | 3/1977 | Murphy et al. | 360/22 |

*Primary Examiner*—Vincent P. Canney
*Attorney, Agent, or Firm*—Cruzan Alexander; Donald M. Sell; William B. Barte

[57] ABSTRACT

A multitrack recorder is disclosed in which each of a plurality of parallel data signals is mixed with an additional signal corresponding to a digital code indicative of the real time at which the data is received. Each of the mixed signals is then conventionally recorded on a separate track of a suitable record medium. The recorder includes a circuit which shifts the phase of the recorded data signals with respect to each other, while keeping the phase of all recorded time signals in phase with each other. Upon playback, the signals from all tracks are added together. The out-of-phase data signals from each track tend to negate each other and the in-phase time related signals reinforce each other, thus becoming readily detectable. Preferably, the digital time related signals are encoded as two frequencies, both of which are below the band width of the data signals, such that frequency filters may also be employed to enhance the recovery of the time code.

14 Claims, 3 Drawing Figures

MULTITRACK RECORDER INCLUDING SUPERIMPOSED REAL TIME CODE

BACKGROUND OF THE INVENTION (1) Field of the Invention

This invention relates to recorders such as those adapted for data logging applications in which data is recorded, together with a code indicative of the time at which the data is received. In particular, this invention is directed to a recorder in which such a time code is multiplexed onto the data and is recorded therewith, being distinguishable therefrom by the frequency components present in the code.

(2) Description of the Prior Art

A variety of recorders in which certain data such as a time code is multiplexed onto other data and the combined signals recorded onto a record medium have previously been known. For example, as early as 1934, it was disclosed in U.S. Pat. No. 1,960,094 (Thurm) that a number of separate records could be magnetically superimposed onto a magnetic recording ribbon by recording each of the records at a different speed. The separate records are there disclosed to be recovered by passing the playback signal through appropriate filters corresponding to the desired reproduced frequencies.

More recently, the specific need to record time related information along with other data and at a frequency outside the frequency spectrum of the other data has been particularly recognized. In U.S. Pat. No. 3,188,615 (Wilcox), there is disclosed an instrumentation recorder in which wide band width data is recorded on a transverse track system together with a standard frequency signal, which is outside the frequency spectrum of the wide band data. In the recorder there disclosed, the data is frequency modulated within a selected range of frequencies and the standard frequency signal which is outside that range of frequencies is added linearly thereto.

U.S. Pat. No. 3,591,731 (Stancil) discloses a recorded in which real time information is recorded simultaneously with other information, rather than merely providing a series of clock or sync pulses which are only referenced at the beginning or end of the recording. In that patent, the time code is said to be generated from sync motors which provide a 60 Hz output voltage proportional to the angle of a clock hand which is outside the frequency range of the other data, thus enabling the use of a bandpass network to reconstruct the time code. Such an analog system is incapable of providing a digital time code and requires a number of channels for each digit of time information.

U.S. Pat. No. 3,732,364 (Terada) discloses a system for multiplexing video and digital signals, in which the digital signal, typically used to represent a file address, is caused to create bursts of a sinusoidal signal having a base frequency outside the video range. The modulated sine wave is then superimposed on the horizontal sync pulse of the video signal. Preferably, digital "1"s and "0"s are associated with bursts of different sinusoidal frequencies.

U.S. Pat. No. 3,945,035 (Goldman) discloses a tape recorder in which a plurality of recording heads are positioned in tandem with each other, spaced apart a distance corresponding to the period of a desired frequency as recorded on the tape. The desired frequency signal is applied simultaneously to all the heads such that the recorded amplitude of the desired signal component is increased over that of all other frequencies. Such a system avoids the need to selectively filter the signals obtained upon playback to recover time related information stored in frequency bands outside that utilized by other information; however, the added complexity in which a number of heads and means for adjusting the spacing therebetween are required is undesirable for high reliability applications.

SUMMARY OF THE INVENTION

In contrast to prior art recorders in which time related information is multiplexed with other information, the present invention is directed to a recorder in which a digital signal representative of real time information is converted into an alternating signal containing two substantially sinusoidal frequency components corresponding to digital "1"s and "0"s, respectively, each of which is below that of the frequencies included in other data signals to be recorded and in which the alternating signal is then multiplexed with the other data signals in a particular fashion.

Specifically, the present invention is directed to a multichannel recorder which includes a plurality of circuits, each of which includes means for amplifying and receiving one of a plurality of analog data signals, means for shifting the received data signals in certain of the circuits out-of-phase with each other, and means for mixing a component of the alternating signal representative of the digitized real time information with the received data signal in each circuit, while maintaining the component of the alternating signal in each circuit in phase with each other. The mixed signals of each circuit are then recorded on a separate track of a multitrack recording medium.

Upon playback, the recorded signals on each track are recovered and processed through a plurality of amplifiers to provide output signals corresponding to data signals in a conventional manner. The recovered signals from each track are also algebraically added together in a time code recovery network such that the out-of-phase data signals at least partially negate each other and the recovered alternating signal components, all of which are in-phase, reinforce each other, to thereby provide a readily detectable signal having a level which exceeds that attributable to the data signals.

Preferably, the recorder includes means, such as a bandpass filter, for removing substantially all frequencies from the received data signals which are less than a predetermined frequency, together with means, such as a controlled frequency oscillator, for generating the two substantially sinusoidal frequency components at frequencies less than the predetermined frequency. Such an embodiment thus enables a frequency-sensitive detector to be utilized upon playback to enhance the reconstruction of the real time information. Desirably, such a detector includes a low-frequency bandpass filter which removes substantially all traces of the recovered data signals. The filtered recovered signal is then suitably processed to reconstruct a digital output signal indicative of the real time at which the corresponding data signals were recorded.

The thus described recorder to the present invention may be utilized in a variety of applications where real time information is desirably recorded along with other information. It is particularly suited for use in data logging applications such as in public safety dispatch centers controlling emergency operations, aircraft control towers, and in providing accurate records of business meetings, legal proceedings, etc. For such applications, the recorder further preferably includes at least two decks, each of which is adapted for record and playback operations, which are suitably interfaced to enable automatic switching therebetween. In such an embodiment, one deck is maintained in an on-line condition, while the second deck, in standby, may be played back without interfering with recording operations on the first deck. Likewise, for such operations, networks enabling voice actuation are also desirably included.

DESCRIPTION OF THE PREFERRED EMBODIMENTS

Figure 1:
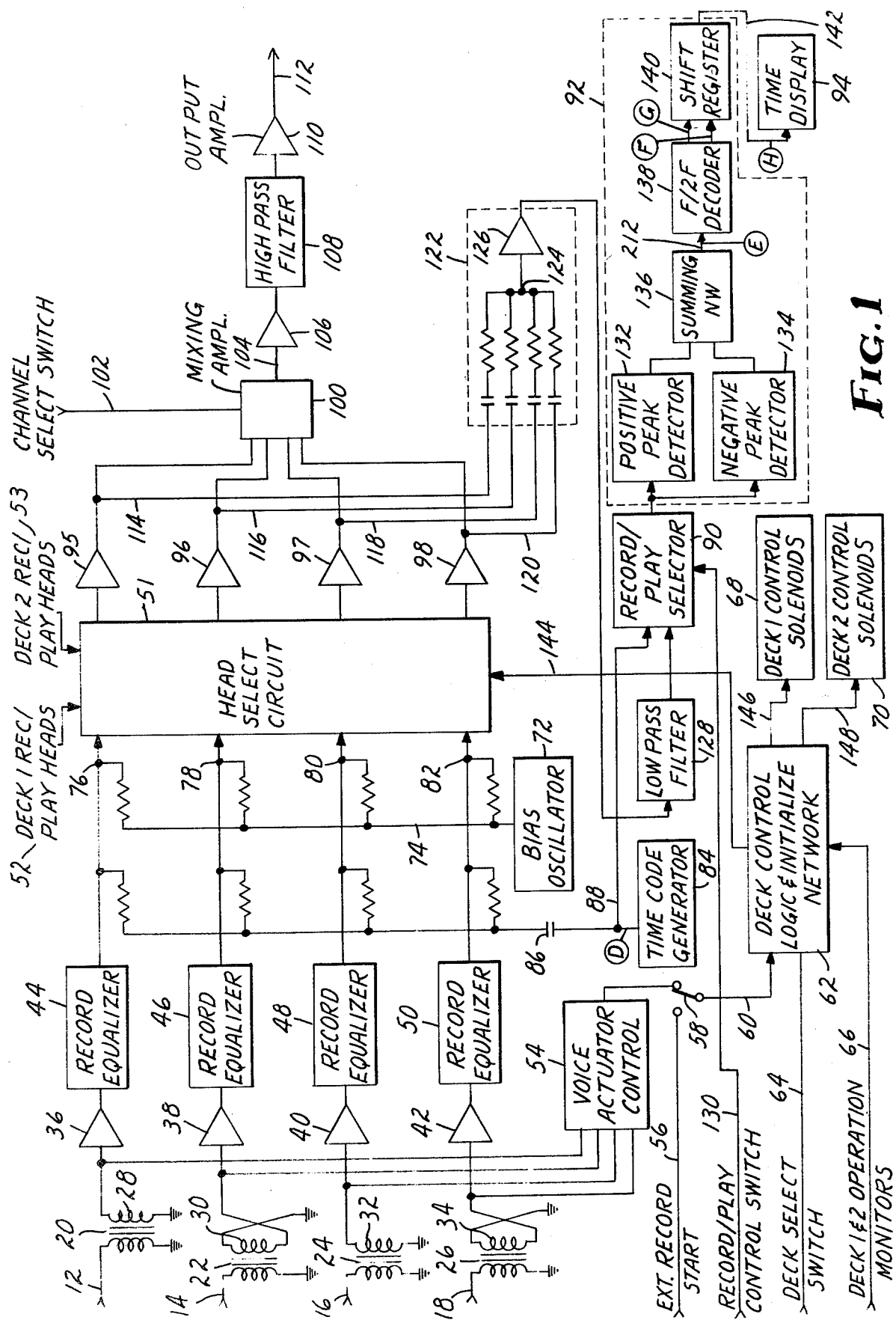
FIG. 1 is a block diagram of the recorder of the present invention.

A preferred embodiment of the recorder of the present invention, set forth in the block diagram of FIG. 1, provides for recording four parallel tracks of incoming audio data together with a superimposed time code on either of two decks, both of which are interconnected to enable automatic switching from one deck to the other. Such a recorder is particularly adapted for data logging applications. The incoming audio signals for each of the four channels are received on input terminals 12, 14, 16 and 18, respectively, which signals are then coupled through filter networks (not shown) to transformers 20, 22, 24 and 26, respectively. Each filter network desirably includes a high pass filter which allows only signals in excess of approximately 300 Hz. to pass therethrough. Such a filter may conveniently comprise a series resonant circuit including, for example, a 470Ω resistor and a 0.18 μf capacitor. The output secondaries 30 and 34 of the transformers 22 and 26 are alternated in phase with respect to secondaries 28 and 32 by reversing the output terminals such that the audio data thereafter processed in adjacent channels are 180° out of phase with each other. Each secondary 28, 30, 32 and 34 is coupled to an automatic gain control amplifier 36, 38, 40 and 42, to a record equalizing network 44, 46, 48 and 50 and thence finally to a head select circuit 51. The amplifiers 36, 38, 40 and 42 preferably include conventional type 741 integrated circuit amplifiers. A conventional feedback loop within each amplifier in which the output of the amplifier controls the potential on the base of a transistor connected across the input desirably provides the automatic gain control feature. The record equalizer networks 44 through 50 are conventional, tuned resonant circuits, and provide the appropriate high frequency boost to compensate for the lower efficiency with which such frequencies are typically recorded and played back through recording/playback heads and magnetic recording tape. The head select circuit 51 is preferably a conventional relay having a multipole, double-throw contact configuration, such that the respective record, erase and play heads 52 and 53 respectively of one or the other of the two decks may alternately be connected to either the record circuits described hereinabove or to the play circuits described hereinafter. In one embodiment, the record and play sections of each of the two decks are appropriately connected so as to allow on-line recording on one deck while enabling playback from the deck in the standby mode.

Signals from a bias oscillator 72 are also coupled via lead 74 through appropriate (47 KΩ) biasing resistors to nodes 76, 78, 80 and 82, respectively, and thence to the appropriate record heads through the head select circuit 51. The bias oscillator 72 is preferably of conventional design and needs no further description herein.

Likewise, signals from a time code generator circuit 84 are coupled through capacitor 86 and appropriate (47KΩ) coupling resistors to the nodes 76, 78, 80 and 82, such that the time code is superimposed on the audio signals in each channel, all of the time code components, however, being in phase with each other. The details of the time code generator 84 are set forth in FIG. 2. However, it includes a free-running master clock which generates a digital signal indicative of the real time, i.e., the minute, hour and day at which data is received, and provides an output consisting of an alternating signal in which the digital signal is represented by two substantially sinusoidal frequency components, one of which corresponds to the digital "1"s, while the other corresponds to the digital "0"s. In a preferred embodiment, a 34 Hz component in the time code signal corresponds to the digital "0"s and a 68 Hz signal corresponds to the digital "1"s. Such a signal, construed as a "F/2F" tone, is then mixed with the incoming audio data on nodes 76, 78, 80 and 82. The time code "F/2F" signals are also coupled via lead 88 to a record/play selector 90 and thence to a time code detect network 92, to enable a real time signal to be coupled to the time display 94, thereby enabling the display of the real time while the recording is being made.

The outputs of the secondary windings 28, 30, 32 and 34 of transformers 20, 22, 24, and 26 respectively, are also coupled to a voice actuator control network 54 which includes appropriate threshold adjustment circuits for each channel such that a given level of input signal is required to actuate the record mechanism. If desired, an external record start signal may be provided on lead 56. Switch 58 allows manual selection between such an external start signal and voice actuated start signals.

The start signal from the switch 58 is coupled on lead 60 to a deck control logic and initialize network 62 which provides output signals for automatically placing each deck in the desired mode of operation. That network is also controlled by external signals on leads 64 enabling manual selection of a given deck. Further, as set forth in more detail hereinafter, and in U.S. Pat. No. 4,012,784 (Murphy et al), the disclosure of which is incorporated herein by reference, the operation of each deck is desirably monitored via suitable detectors on each deck. The outputs from such monitors are coupled on leads 66 (shown in FIG. 1 as a single lead) to the deck control logic and initialize network 62. The record, playback and erase heads 52 and 53 of both decks, coupled via appropriate input and output leads to the head select circuit 51, are thus appropriately switched by signals from the network 62. Analogously, the transport control solenoids 68 and 70 of both decks are coupled to the outputs of the network 62 via control lines 146 and 148, respectively.

As set forth in the above-referenced U.S. Pat. No. 4,012,784, signals from the deck operation monitors, received on leads 66 from each of the respective decks desirably include a "leader sense signal", indicative of the presence of the leader at the start of the tape, an "end of tape" signal indicative of the presence of a trailer at the end of the tape, a "fail" signal indicative of no tape motion, and a "reload-cassette out signal" indicative of the absence of a cassette in the respective deck transport. Each of these signals is appropriately processed through the control logic and initialize network 62 to determine the state of readiness of a given deck in response to each of the respective signals. Thus, for example, the network 62 preferably includes a ready circuit for each of the decks, which when appropriately activated, places the given deck in a standby condition ready to be switched into an on-line mode. That circuit is cleared by either the "reload-cassette out signal" or by the "fail" signal, indicating that the deck is not in a ready or standby condition. Analogously, the occurrence of the "leader-sense-signal" is required prior to the production of such a ready signal. Preferably, in the event that either deck is removed from the ready or on-line status, a short audible warning signal is also supplied by a warning circuit included within the logic and initialize networks 62. If both decks are in either the reload or fail mode, the warning signal is desirably processed to provide a continuous audio tone burst until one of the two decks is returned to the on-line status.

The logic and initialize network 62 primarily comprises a pair of two digit counters for each of the decks, each of which counters has only four possible outputs. These output states are decoded by appropriate networks, and the respective outputs are sent to the appropriate control solenoid 68 or 70 in each deck. Thus, for example, appropriate signals are provided to energize either a fast forward solenoid, a rewind solenoid, a play solenoid, or a standby solenoid in each of the decks. Both counters providing the appropriate energization signals are desirably controlled manually by appropriate push buttons on a control panel via leads 64, or automatically in response to the deck operation monitors via the input leads 66.

Accordingly, the operation of the initialization function is automatically performed upon insertion of a cassette in a given deck, provided that the record tab on the cassette is in place. When such a cassette is inserted, a file protect switch is closed, which forces the appropriate counter within the logic and initialize network 62 to a state which energizes the rewind solenoid on that deck. Upon completion of the rewind operation, such that the "leader sense" signal is provided on one of the leads 66, appropriate signals will then be generated to de-energize the rewind solenoid and to energize the appropriate fast-forward solenoid for approximately 2 seconds to allow the transport sufficient time to wind the clear leader of the cassette and to move onto the beginning of the darker tape. When the 2 second interval has elapsed, the ready circuit is activated, thus placing the appropriate deck in a standby condition. A voice actuated control signal on lead 60 may then be acted upon through the network 62, placing the appropriate deck and record head therein in a play/record mode. Similarly, if either "end-of-tape" or "fail" signals are received from one deck, that deck is automatically switched to stop and the other deck automatically switched to the record or on-line mode.

Preferably, each of the decks includes a two-speed transport mechanism such as that disclosed in U.S. Ser. No. 936,171 and filed on the same day herewith. The speed change mechanisms within such decks are further energized via the network 62. Thus, for example, the low speed in each deck may be utilized in either the stop or play mode while the high speed may be utilized in either the fast forward or rewind condition.

The playback section of the recorder includes preamplifiers 95, 96, 97 and 98 for each of the tracks within each of the decks. Each of the preamplifiers is of conventional design and typically includes a two-stage amplifier, such as that formed from transistor types 2N7566 and 2N3392 coupled in series. The output of each of the preamplifiers is coupled to a channel select switch 100, such as an integrated circuit switch type CD 4016, the output of which is controlled via a channel select switch through lead 102, so as to enable signals from a given one of the four channels to be selected. The selected output is then coupled via lead 104 through a buffer amplifier 106, typically an integrated circuit type 741 amplifier, a high pass filter 108 and an output amplifier 110 to provide an audio output on lead 112. The output amplifier 110 may typically be an integrated circuit such as type LM 380.

The output from each of the preamplifiers 95, 96, 97 and 98 is also coupled via leads 114, 116, 118 and 120, respectively, to a summing network 122. This network comprises a set of 10 KΩ resistors and 10 μf capacitors in series. The outputs from each channel are then summed within the network 122 at node 124 and pass through an amplifier 126, such as an integrated circuit Type 741. The output of the amplifier 126 is coupled to an active low pass filter 128, preferably comprising a two-stage filter such as two type 741 amplifiers in series, each of which has tuned RC networks therewith, so as to attenuate all audio frequencies above 80 Hz, while amplifying the 34 and 68 Hz time code frequencies. The output of the filter 128 is coupled to the record/play selector 90, which is controlled by a record/play control switch on lead 130, and enables either the time code as provided from the low pass filter 128 or that provided from the time code generator 84 on lead 88 to be coupled to the time code detail network 92. Thus, for example, when a deck in standby status is played, the time code tones as reconstructed through the filter 128 are coupled to the network 92. When neither deck is being played, the selector 90 connects the incoming time code tone from the generator 84 directly to the input of the detail network 92 such that the real time is displayed.

Within the network 92, the selected time code signal is applied in parallel to a positive peak detector circuit 132 and to a negative peak detector 134. Each of these respective detectors comprises a conventional transistorized peak detector circuit. The outputs of each of the detectors are summed through a summing network 136, such as consisting of a NOR gate followed by an inverter stage, which also differentiates the positive and negative peaks.

The differentiated output from the summing network 136 is coupled to an "F/2F" decoder 138, which preferably includes a pair of one-shot multivibrators such as type 74C74, which separates the F and the 2F signal components. These components, together with a reconstructed clock signal are loaded into a shift register 140 such as type 74C164, at a rate controlled by the reconstructed clock signal, to provide a reconstructed time code signal on lead 142. The reconstructed time code is then coupled to the time display 94, together with the clock signal and a strobe signal, generated by a NAND gate coupled to appropriate outputs of the shift register 140.

Figure 2:
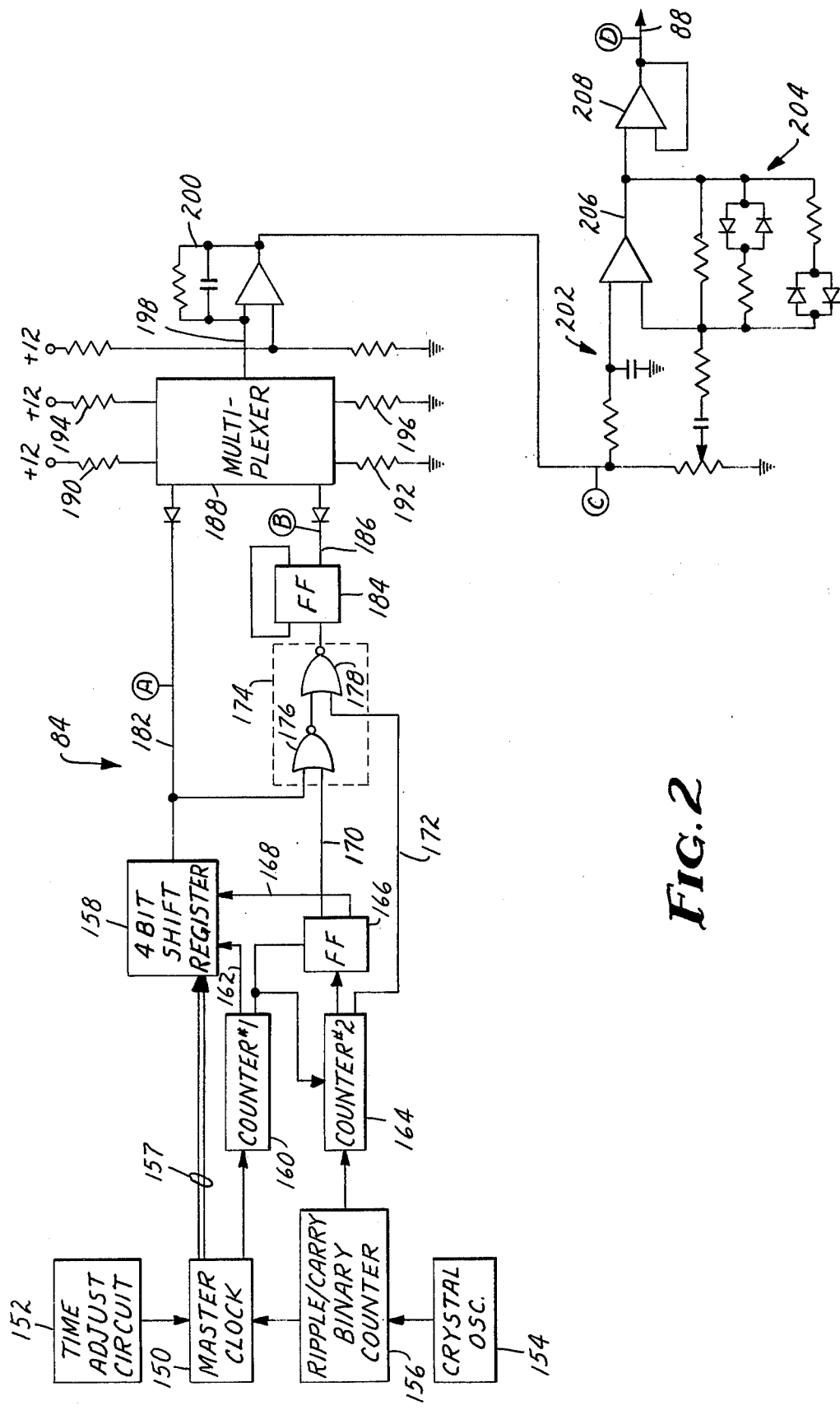
FIG. 2 is a combined block and circuit drawing of a preferred embodiment of the time code generator utilized in the embodiment of FIG. 1.

The details of the time code generator 84 shown in FIG. 1 are set forth in FIG. 2. In that figure, it may be seen that the time code generator is based on a master clock 150 such as an integrated circuit type CT 7002. Such an integrated circuit is manufactured by Fairchild Semiconductor, Inc. While a variety of digital clock integrated circuits may be similarly used, a Type CT 7002 circuit is preferred in that it provides a binary code decimal (BCD) output which includes both clock and calendar signal components. In contrast, most other digital clock integrated circuits provide a multiplexed seven-segment output which must then be converted to provide the desired BCD output signal. The clock 150 is controlled by a time adjustment circuit 152, thereby enabling the adjustment of the real time setting. Such circuits are well known to those skilled in the art and are set forth in the data sheets for the selected clock circuits.

The clock 150 is driven from a crystal oscillator 154, which is coupled through a ripple carry binary counter 156. The counter 156 is preferably formed of an integrated circuit type CD4060 and counts down the oscillator frequency to 1.91 kHz to provide a multiplex timing signal and a 60 Hz reference signal to the master clock 150. The BCD output from the master clock 150 is coupled along leads 157 to a shift register 158. Additional outputs from the master clock 150 are coupled to a four-bit binary counter 160 such as integrated circuit type 74C93. This counter, together with associated gates, generates a strobe pulse on lead 162 which controls the loading of the BCD data from the master clock 150 into the shift register 158. The counter 160 essentially provides a "divide by seven" function which causes the shift register 158 to catch every seventh digit from the master clock as the output therefrom is multiplexed within the register 158.

A second four-bit binary counter 164, such as type 74C93, is controlled in part by the first counter 160, and similarly includes associated gates to also provide a "divide by seven" function. An additional output from the ripple carry binary counter 156 is coupled on lead 172 to the second counter 164 as a 960 Hz signal. This signal is converted by the "divide by seven" function within that counter to a 137 Hz signal. The output of the second counter 164 is coupled through a flip-flop 166, providing a "divide by two" function, thus providing a 68.2 Hz output signal which is coupled to the shift register 158 on lead 168 to provide a clock signal controlling the rate of output from the shift register. The 68.2 Hz signal is also coupled on lead 170 together with an additional 137 Hz signal from the counter 164 on lead 172 to a zero detect circuit 174, which is formed of NOR gates 176 and 178, respectively.

Accordingly, the output from the shift register 158 on lead 182 comprises a non-return to zero (NRZ) serialized output of the BCD code provided by the master clock 150, which is indicative of the real time at which data is being received by the recorder. The serialized NRZ output on lead 182 is coupled to the zero detect circuit 174, which, in response to that signal and the 68 and 137 Hz signals on leads 170 and 172, converts the NRZ data to a "F/2F" code. The output from the zero detect circuit 174 is coupled to a flip-flop 184 which provides an additional "divide by two" function, resulting in a "F/2F" square wave output therefrom on lead 186, having basic frequency components of 68 Hz and 34 Hz, respectively.

Figure 3:
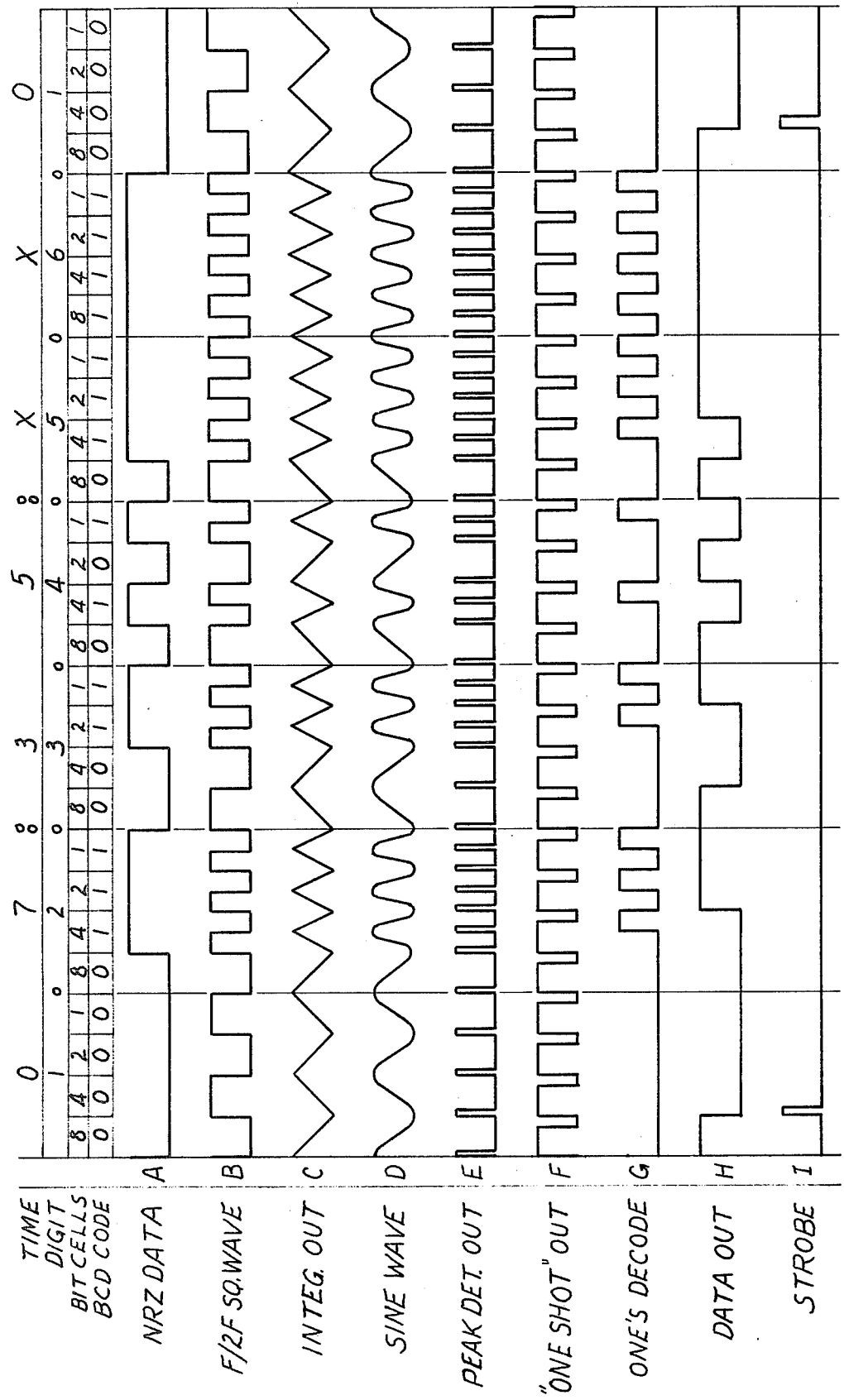
FIG. 3 is a set of typical wave shapes showing a preferred time code as processed in the embodiments shown in FIGS. 1 and 2.

Typical waveforms for a 6 digit code corresponding to an exemplary time of 07:35 are shown in FIG. 3. Such a 4 digit time signal enables the fifth and sixth digits to be used for synchronization data. As is there shown, within the clock 150 (see FIG. 2), each of the digits is converted in a four bit cell to a BCD code in a conventional manner. The shift register 158 converts that signal to a NRZ output signal on lead 182, which appears, for example, as the NRZ data wave form A in FIG. 3. Similarly, the converted "F/2F" square wave from the flip-flop 184 on lead 186 appears as the output wave form B. The two outputs (A and B) are coupled to a four channel multiplexer 188 such as an integrated circuit type CD4052, which acts as a current switch in that the presence of a first frequency component in the "F/2F" square wave results in the output of current from the multiplexer 188 through the 62 KΩ current limiting resistors 190 and 192, respectively. Alternatively, the presence of the second frequency component within the "F/2F" input signal results in the output of current through the 30 KΩ current limiting resistors 194 and 196, respectively. These values are desirably chosen to determine the slope of the output signal from the multiplexer 188 on lead 198 to an integrator 200.

The integrator 200 preferably comprises a conventional operational amplifier such as the integrated circuit type 741, connected in an integrator mode with a 0.22 μF capacitor and a 200 KΩ resistor in parallel therewith, and thus converts the "F/2F" square wave into a triangular shaped waveform such as that shown in waveform C of FIG. 3. The triangular waveform is further processed through a sine wave tone generator 202, which includes an additional operational amplifier such as a type 741 having in parallel therewith a resistor-diode network 204. The values of the network 204 are selectively chosen so as to provide a limiting function at various relative amplitudes of the triangular waveform provided the output of the integrator 200. The selective limiting action thus results in the shaping of various amplitude portions of the triangular waveform so as to provide a substantially sinusoidal output on lead 206 therefrom. This output is coupled through a buffer amplifier 208 to provide a sinusoidal output on lead 88, which contains the two substantially sinusoidal frequencies representative of the real time information. The illustrative sinusoidal waveforms thus provided are shown as waveform D in FIG. 3. As further shown in FIG. 1, this output is coupled on lead 88 to the audio record portion and to the record/play selector 90 for coupling the time code to the decoder.

The remaining waveforms shown in FIG. 3 are best related with reference to FIG. 1. Waveform E represents the peak detector output provided at the output of the summing network 136 on output lead 212. This output is converted through the "F/2F" decoder 138 to provide a "one-shot" output, such as shown in waveform F of FIG. 3. The shift register 140 processes the "one-shot" signal to provide a digital "one" decode signal such as shown in waveform G of FIG. 3. The "one-shot" and "one" decode signals (waveforms F and G) are combined within the shift register 140 to provide an output signal therefrom on lead 142 which consists of the fully reconstructed NRZ data such as shown in waveform H of FIG. 3. This signal is then coupled to a suitable time display 94.

While the preferred embodiment is disclosed to utilize frequencies of 34 and 68 Hz for encoding the real time related information, it is similarly within the scope of the present invention that a variety of other frequencies may be used. For example, while it is preferable in the present invention that such frequencies be below the band of frequencies included within other data to be recorded, the present invention is also operative where the frequencies utilized to form the time code are within the same range of frequencies utilized by the other data. When such information is multiplexed together as described hereinabove, the time code may nonetheless be readily detected in that non-time code data within the same frequency ranges will be at least partially negated as a result of the out-of-phase processing of such data. Contrariwise, the same frequency components representing the time code information will be recorded in phase and will thus reinforce each other upon playback so as to provide a more intense signal which is thus readily detectable.

The specific circuits and networks utilized in the preferred embodiments discussed hereinabove are conventional, and are well known to those skilled in the art. While the specific integrated circuits discussed above are commercially available and are particularly desired for use in the circuits as discussed above, other circuits designed for use with discrete components, electromechanical analogs, and the like, which perform the requisite functions, are similarly within the scope of the present invention.

Having thus described the present invention, what is claimed is:

1. A multichannel recorder for recording real time information together with other information, comprising
   (a) a plurality of circuits, each of which is adapted for receiving and amplifying one of a plurality of analog data signals, including means for shifting received data signals in certain of said circuits out of phase with each other,
   (b) means for generating a signal indicative of the real time at which said data signals are received, including
      (i) means for generating a digital signal corresponding to said real time having two different width pulses representing digital "1"s and "0"s, respectively.
      (ii) means for converting said first and second width pulses into an alternating signal containing two substantially sinusoidal frequency components, one frequency corresponding to said first width pulse and a second frequency corresponding to said second width pulses,
   (c) means associated with each circuit for mixing a component of said alternating signal with said data signal therein, while maintaining each said alternating signal components within each circuit in phase with each other, and
   (d) means for recording each of said mixed data signals and alternating signals on a separate track of a multitrack recording medium,
   wherein said time code information may be reconstructed by adding together signals recovered from tracks such that recovered data signals which are out-of-phase with each other at least partially negate each other, and recovered alternating signal components, all of which are in-phase, reinforce each other to provide a readily detectable signal having a level exceeding that attributable to said data signals.

2. A recorder according to claim 1, further comprising means for removing substantially all frequencies from said received data signals less than a predetermined frequency, means for generating said first and second frequency components at frequencies less than said predetermined frequency, whereby a frequency sensitive detector may be utilized upon playback to enhance the reconstruction of said real time information.

3. A recorder according to claim 1, comprising an even plurality of said circuits including means for shifting data signals received in each pair of circuits out-of-phase with each other, whereby said time code information may be reconstructed upon playback by adding signals from pairs of tracks corresponding to said pairs of circuits.

4. A recorder according to claim 3, including at least four amplifier circuits, each adapted for receiving separate audio data signals in which means are provided for shifting signals in a first pair of said four circuits out-of-phase with each other and for shifting signals in a second pair out-of-phase with each other.

5. A recorder according to claim 3, including means for shifting data signals in each pair of circuits 180° with respect to each other.

6. A recorder according to claim 1, wherein said signal generating means includes means for generating said different width pulses wherein one pulse is substantially twice the width of the other, and means for converting said pulses into said two frequency components wherein one frequency component is substantially twice the other.

7. A recorder according to claim 1, wherein said digital signal generating means includes a base clock generator for providing a digital output corresponding to said real time, a shift register coupled to said base clock generator for providing a serialized F/2F pulse code modulated signal and means coupled to said shift register for converting said F/2F pulse code modulated signal to said sinusoidal waves.

8. A recorder according to claim 1, further comprising means for supplying said data signals to said mixing means at a substantially constant record level and for supplying said sinusoidal waves to said mixing means at a signal level at least 20 db less than that of said record level.

9. A recorder according to claim 1, wherein said converting means includes means for integrating said pulses, means for further shaping said integrated pulses to provide said sinusoidal frequency components.

10. A recorder according to any of claims 1-9, further including a playback section comprising means for generating playback signals from each of said tracks, amplifier means for intensifying said playback signals, means coupled to said amplifier means for algebraically summing all signals therefrom, such that said out-of-phase data signals at least partially negate each other and said in-phase sinusoidal frequency components are cumulatively added to provide an intensified signal, and decoder means coupled to said summing means for discriminating between said intensified in-phase signals and said partially negated out-of-phase signals, to provide a regenerated digital signal indicative of said time at which the data signals were recorded.

11. A recorder according to claim 10, wherein said summing means includes a low pass filter having an upper cutoff frequency of less than 100 Hz for further distinguishing said in-phase signals from said out-of-phase data signals.

12. A recorder according to claim 10, wherein said decoder means comprises means for detecting signals having peak amplitudes exceeding a predetermined level.

13. A recorder according to claim 1, adapted for voice logging applications, further comprising means responsive to the presence of data signals for providing a record start signal and control means responsive to said record start signal for initiating operation of said recording means.

14. A recorder according to claim 13, comprising at least two tape transport decks, including means for recording mixed data signals and alternating signal components on a given track of a multitrack recording medium transported thereon, means responsive to said control means for initiating operation of a given one of said decks, means responsive to the operating condition of each of said decks for providing a record disable signal and means within said control means responsive to said record disable signal for disabling a given deck and for initiating operation of the recording means on another deck.

* * * * *